US009026603B2

(12) United States Patent
Nahidipour

(10) Patent No.: US 9,026,603 B2
(45) Date of Patent: May 5, 2015

(54) DEVICE CONFIGURATION INCLUDING A MASTER COMMUNICATIONS DEVICE WITH A SLAVE DEVICE EXTENSION

(75) Inventor: Aram Nahidipour, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 113 days.

(21) Appl. No.: 13/173,974

(22) Filed: Jun. 30, 2011

(65) Prior Publication Data

US 2013/0007178 A1    Jan. 3, 2013

(51) Int. Cl.
*G06F 15/16* (2006.01)
*H04L 29/08* (2006.01)
*H04W 84/20* (2009.01)

(52) U.S. Cl.
CPC ............ *H04L 67/1095* (2013.01); *H04W 84/20* (2013.01); *H04L 67/04* (2013.01)

(58) Field of Classification Search
CPC ............................... G06F 9/3877; G06F 15/12
USPC .......................................... 709/208, 209, 210
See application file for complete search history.

(56) References Cited

U.S. PATENT DOCUMENTS

| 6,643,124 B1* | 11/2003 | Wilk ......................... 361/679.04 |
| 7,590,097 B2* | 9/2009 | Ekberg et al. ................. 370/338 |
| 2003/0236889 A1* | 12/2003 | Manion et al. ................ 709/227 |
| 2004/0240451 A1* | 12/2004 | Lee et al. ................... 370/395.5 |
| 2005/0091359 A1* | 4/2005 | Soin et al. ..................... 709/223 |
| 2006/0031378 A1* | 2/2006 | Vallapureddy et al. ....... 709/208 |
| 2006/0155802 A1* | 7/2006 | He et al. ......................... 709/203 |
| 2006/0156115 A1* | 7/2006 | Kim et al. ..................... 714/724 |
| 2010/0064228 A1* | 3/2010 | Tsern ............................ 715/740 |
| 2010/0151791 A1* | 6/2010 | Yi et al. ....................... 455/41.3 |
| 2010/0177019 A1* | 7/2010 | Jeong et al. .................... 345/1.3 |
| 2010/0191352 A1* | 7/2010 | Quail ............................. 700/90 |
| 2010/0299401 A1* | 11/2010 | Lloyd ........................... 709/209 |
| 2010/0313150 A1* | 12/2010 | Morris et al. ................. 715/761 |
| 2010/0325576 A1* | 12/2010 | Olsen ........................... 715/790 |
| 2011/0050975 A1* | 3/2011 | Chung .................... 348/333.02 |
| 2011/0126141 A1* | 5/2011 | King et al. .................... 715/769 |
| 2011/0216064 A1* | 9/2011 | Dahl et al. .................... 345/428 |
| 2012/0167126 A1* | 6/2012 | Paek et al. ...................... 725/14 |
| 2012/0176746 A1* | 7/2012 | Chen et al. ............... 361/679.55 |
| 2012/0198344 A1* | 8/2012 | Tukol et al. ................... 715/735 |
| 2012/0210263 A1* | 8/2012 | Perry et al. ................... 715/769 |
| 2013/0109371 A1* | 5/2013 | Brogan et al. ................ 455/420 |

* cited by examiner

*Primary Examiner* — Lynn Feild
*Assistant Examiner* — Jonathan Bui
(74) *Attorney, Agent, or Firm* — Sterne, Kessler, Goldstein & Fox, P.L.L.C.

(57) ABSTRACT

A master communications device/slave device configuration is disclosed where a master communications device discovers a slave device when the master communications device does not have the necessary features and resources to perform a service requested by an operator. The master communications device utilizes the slave device to provide additional features and resources to the master communications device in performing the service requested by the operator. The master communications device and the slave device interact as a single device provided by the master communications device/slave device configuration. The slave device serves as an extension to the master communications device providing a larger interface to the operator.

22 Claims, 11 Drawing Sheets

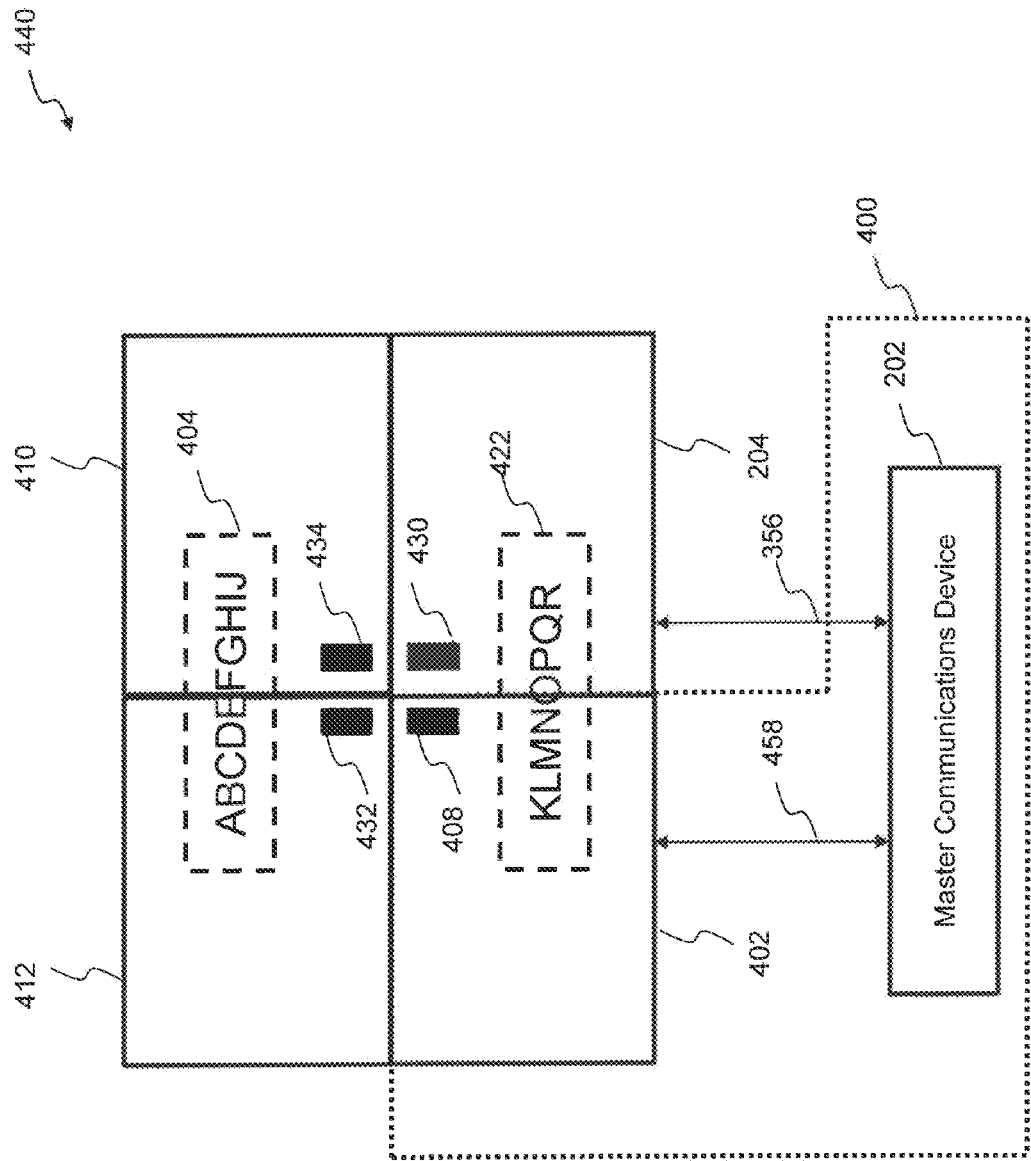

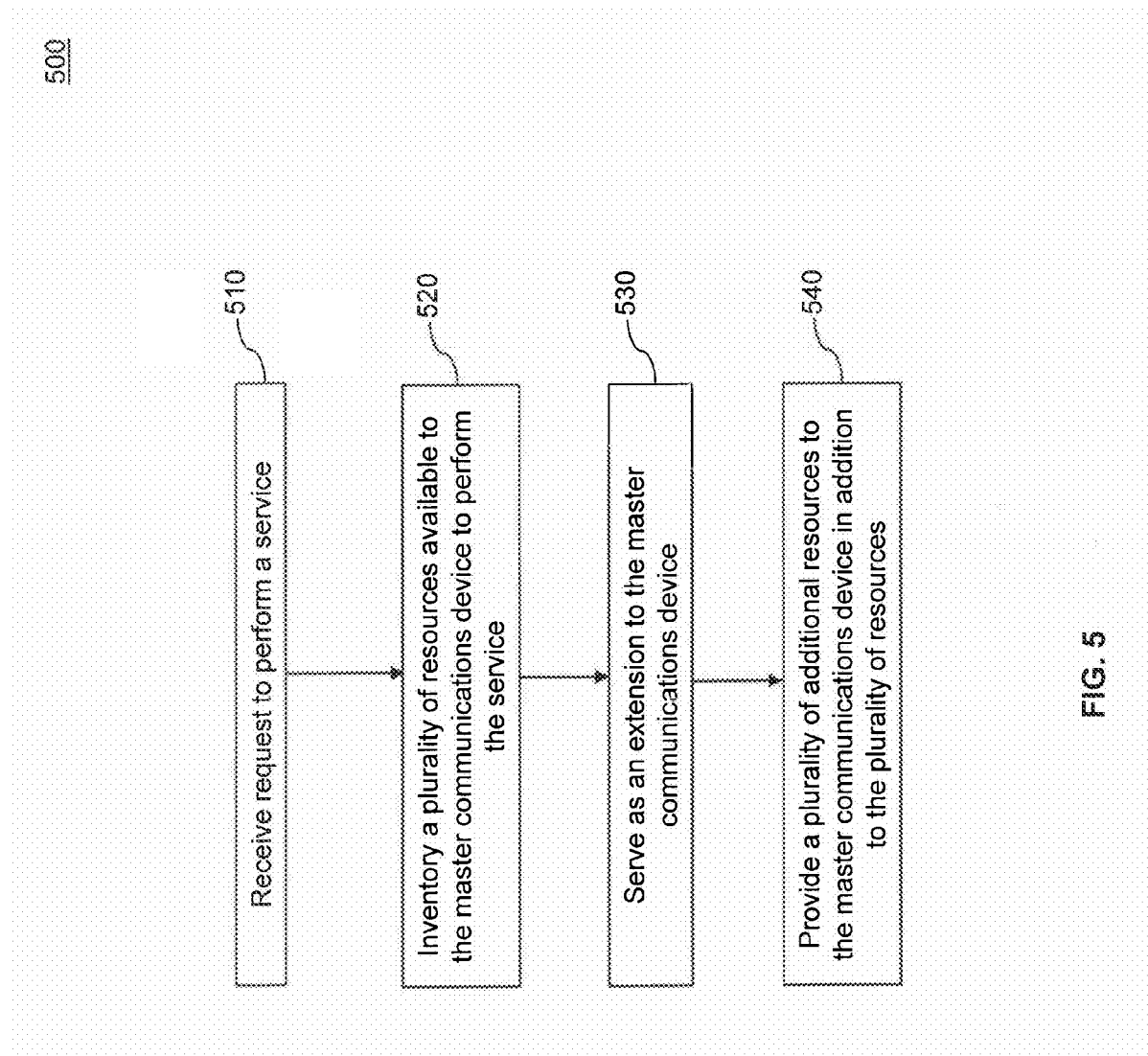

DEVICE CONFIGURATION INCLUDING A MASTER COMMUNICATIONS DEVICE WITH A SLAVE DEVICE EXTENSION

BACKGROUND

1. Field of Invention

The invention relates to communications devices, and more specifically to intelligently operating multiple communications devices within an interactive communications system environment.

2. Related Art

Typically, a communications system includes a single device that allows an operator to operate and/or control the communications system. For example, the operator when interacting with the communications system is limited to the features and resources available to the operator by the device.

Operation of the communications system in the manner described above limits the operator to the size and the capabilities of the conventional device when interacting with the communications system. The typical device may be adequate for the operator when performing certain tasks with the communications system such as placing a telephone call. However, the operator may also wish to operate the communications system for other tasks that require additional features and resources that the device cannot provide such as simultaneously browsing the internet and/or reading emails. The operator of the communications system will be limited to the conventional device and cannot add to the features and resources of the conventional device, such as increase the size of the display for the conventional device to provide an example, in operating the communications system.

Thus, there is a need to add additional features and resources to the conventional device when required by the operator while allowing the operator to return to the conventional device when the operator no longer requires additional features and resources. Further aspects and advantages of the invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

FIG. 4C illustrates a second exemplary master communications device/slave device configuration according to an exemplary embodiment of this invention;

FIG. 5 is a flowchart of exemplary operational steps of the user interface controller according to an exemplary embodiment of the present invention.

Figure 1A:
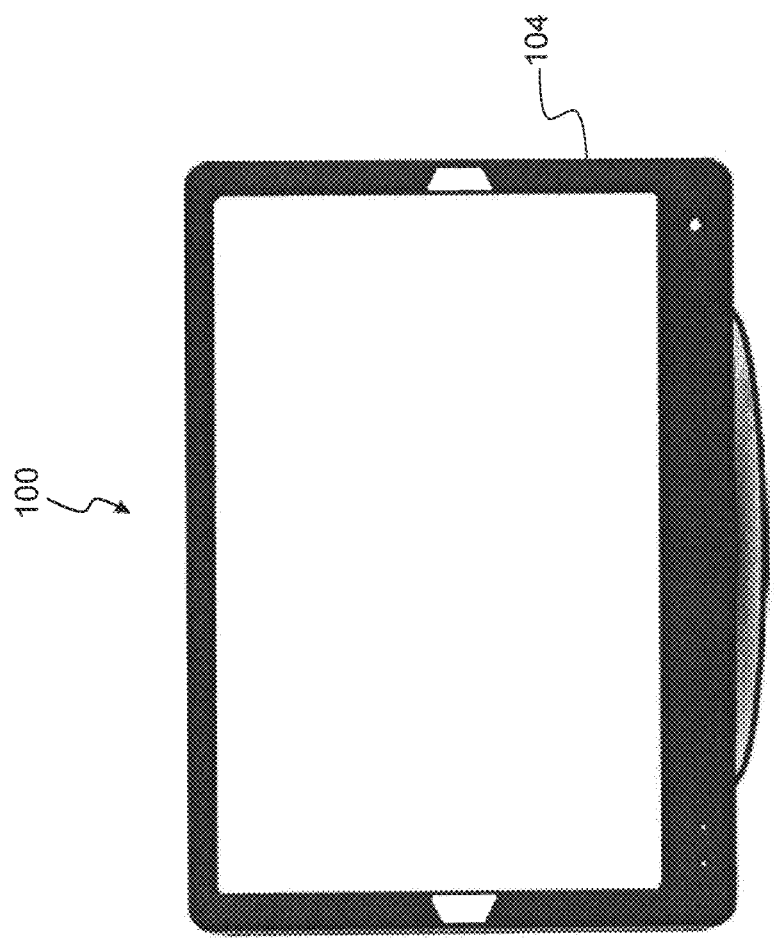
FIG. 1A illustrates a first display/touch screen interactive environment that incorporates a master device and a slave device into a display/touch screen interactive environment according to an exemplary embodiment of the invention.
Figure 1A:
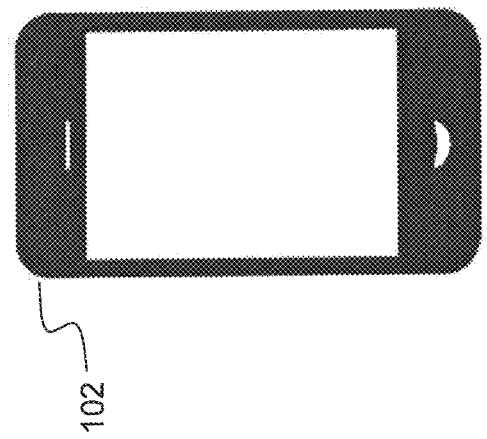

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Exemplary Embodiments of Operational Environments Incorporating a Master Device and a Slave Device FIG. 1A illustrates a first display/touch screen interactive environment that integrates a master device and a slave device into the display/touch screen interactive environment according to an exemplary embodiment of the invention. The display/touch screen interactive environment 100 includes a master device 102 and a slave device 104.

As illustrated, the master device 102 is illustrated as a wireless phone that includes a touch screen display to provide sensing information to the master device 102 along with acting as a display for the master device 102. The master device 102 may also include an alphanumeric keypad, a microphone, a mouse, a speaker, a liquid crystal display (LCD), a light emitting diode (LED), a projector, a plasma television, data light processing (DLP) projector, liquid crystal on silicon (LCoS), digital direct drive image light amplifier (D-ILA), cathode ray tube (CRT), and/or any other suitable interactive device that will be apparent to those skilled in the relevant art(s) without departing from the spirit and scope of the invention, or any combination thereof.

The slave device 104 is illustrated as a liquid crystal display (LCD). The slave device 104 may also include a touch-screen display, an alphanumeric keypad, a microphone, a mouse, a speaker, a liquid crystal display (LCD), a light emitting diode (LED), a projector, a plasma television, data light processing (DLP) projector, liquid crystal on silicon (LCoS), digital direct drive image light amplifier (D-ILA), cathode ray tube (CRT), and/or any other suitable interactive device that will be apparent to those skilled in the relevant art(s) without departing from the spirit and scope of the invention, or any combination thereof.

The touch screen display of the master device 102 may not be sufficient for the operator as the operator interacts with the master device 102. The operator may require additional features and resources to supplement the touch screen display of the master device 102, for example, a larger screen for ease of viewing or simply a second display for simultaneously viewing different content. In doing so, the master device 102 may engage the slave device 104. The master device 102 may then supplement the touch screen display with the LCD of the slave device 104 where the slave device may act as an extension to the touch screen display of the master device 102.

Figure 1B:
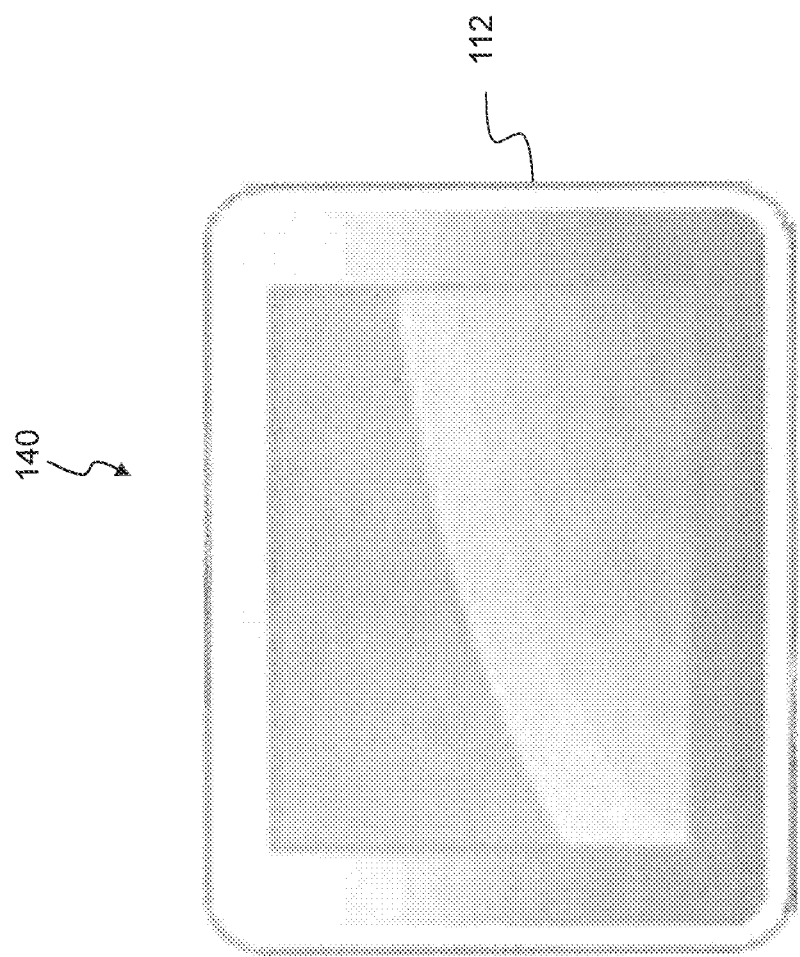
FIG. 1B illustrates a second display/touch screen interactive environment that incorporates a master device and a slave device into a display/touch screen environment according to an exemplary embodiment of the invention.
Figure 1B:
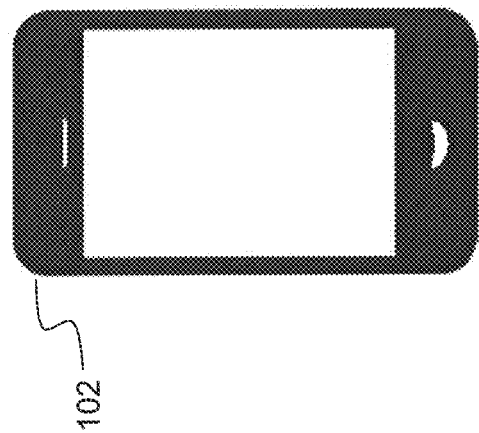

FIG. 1B illustrates a second display/touch screen interactive environment that incorporates a master device and a slave device into a display environment according to an exemplary embodiment of the invention. The display/touch screen interactive environment 140 includes the master device 102 and a slave device 112. In this exemplary embodiment, the master device 102 is illustrated as a wireless phone that includes a touch screen display that provides sensing information to the master device 102 along with acting as the display for the master device 102. The slave device 112 is also illustrated as a touch screen display and may be a tablet computer for example. The slave device 112 may act as an extension to the master device 102 giving the operator a larger display and sensing interface to interact with.

Figure 1C:
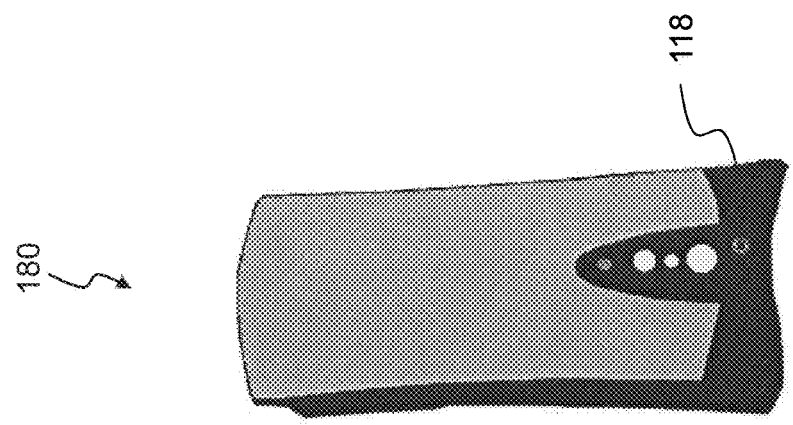
FIG. 1C illustrates an audio/display interactive environment that incorporates a master device and a slave device into an audio/display interactive environment according to an exemplary embodiment of the invention.
Figure 1C:
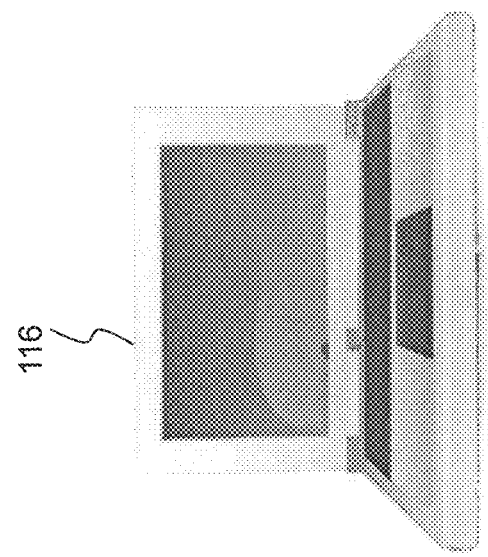

FIG. 1C illustrates an audio/display interactive environment that incorporates a master device and a slave device into an audio/display environment according to an exemplary embodiment of the invention. The audio/display interactive environment 180 includes a master device 116 and a slave device 118. The master device 116 is illustrated as a personal laptop that includes a display. The slave device 108 is illustrated as a speaker. The slave device 108 may act as an extension of the master device 116 giving the operator audio along with a display to interact with when engaging the audio/display interactive environment 180.

A First Exemplary Master Communications Device/Slave Device Configuration

Figure 2:
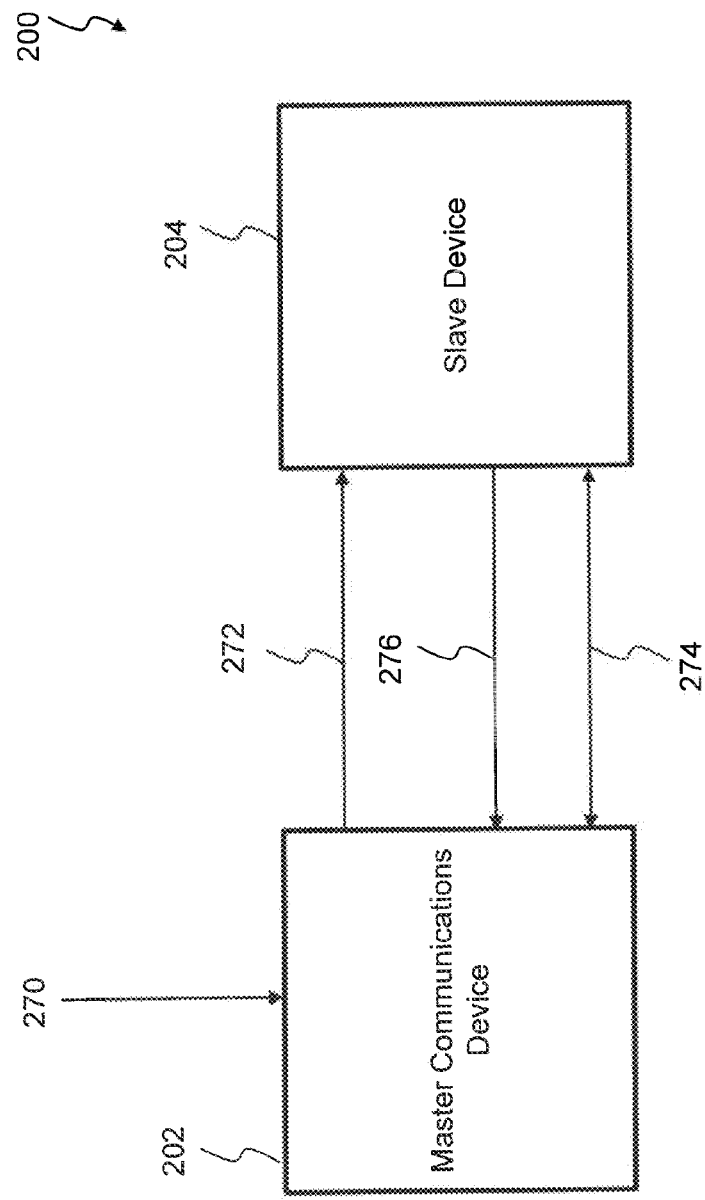
FIG. 2 illustrates a block diagram of a first master slave communications system according to an exemplary embodiment of the invention.

FIG. 2 illustrates a block diagram of a master slave communications system 200 according to an exemplary embodiment of the invention. A master communications device 202 may be integrated with a slave device 204 to form the master slave communications system 200, where the slave device 204 may be representative of a plurality of slave devices 204.

The master communications device 202 may be, for example, a mobile telephone, a portable computing device, other computing devices such as a personal computer, a laptop, or a desktop computer, a computer peripheral such as a printer, a portable audio and/or a video player, a payment system, a ticketing writing system such as a parking ticketing system, a bus ticketing system, a train ticketing system or an entrance ticketing system to provide some examples, or in a ticket reading system, a toy, a game, a poster, packaging, an advertising material, a product inventory checking system and/or any other suitable electronic device that will be apparent to those skilled in the relevant art(s) without departing from the spirit and scope of the invention.

The master communications device 202 may also include a touch-screen display, an alphanumeric keypad, a microphone, a mouse, a speaker, a liquid crystal display (LCD), a light emitting diode (LED), a projector, a plasma television, data light processing (DLP) projector, liquid crystal on silicon (LCoS), digital direct drive image light amplifier (D-ILA), cathode ray tube (CRT), and/or any other suitable user interface that will be apparent to those skilled in the relevant art(s) without departing from the spirit and scope of the invention, or any combination thereof.

The slave device 204 may include a touch-screen display, an alphanumeric keypad, a microphone, a mouse, a speaker, and/or a liquid crystal display (LCD), a light emitting diode (LED), a projector, a plasma television, data light processing (DLP) projector, liquid crystal on silicon (LCoS), digital direct drive image light amplifier (D-ILA), cathode ray tube (CRT) and/or any other suitable device that will be apparent to those skilled in the relevant art(s) without departing from the spirit and scope of the invention, or any combination thereof.

The master slave communications system 200 enables the seamless and automated attachment of the slave device 204 to the master communications device 202. The operator may require additional functions and resources that the master communications device 202 alone cannot provide. In such a case, the master communications device 202 may in a seamless and automated fashion engage the slave device 204 where the slave device 204 and the master communications device 202 provide an interactive communications system to the operator.

For example, the operator may enter a conference room with a master communications device 202 that is a personal laptop. The operator may require a larger display to properly display the information currently displayed on the master communications device 202. The master communications device 202 may engage the slave device 204 that is a projector located in the conference room to display the information of the master communications device 202 on the wall of the conference room. Such an interaction between the master communications device 202 and the slave device 204 may be seamless and automated.

When requested to perform a particular service by the operator, the master communications device 202 takes an inventory of the features and resources that are necessary for providing the particular service, and compares the inventory to those resources contained solely in the master communications device 202. If the features and resources contained in the master communications device 202 are sufficient to perform the service for the operator, then the master communications device 202 performs the service. However, if the features and resources of the master communications device 202 are not be sufficient to perform the service for the operator, then the master communications device 202 may engage the slave device 204 to provide additional features and resources that are necessary or desired to perform the service.

The master communications device 202 may operate in a discovery mode and the slave device 204 may operate in an advertise mode. The master communications device 202 enters into discovery mode to search for slave devices, such as the slave device 204, to expand the features and resources of the master communications device 202 to include the features and resources of the slave device 204. The slave device 204 enters into advertise mode to notify the master communications device 202 that the slave device 204 is ready to engage with the master communications device 202. Either the master communications device 202 and/or the slave device 204 may initiate the engagement between the devices. The operator may also set both the master communications device 202 and the slave device 204 into the discovery and advertise modes, respectively. In an embodiment, the master communications device 202 has no inherent resources of its own, and therefore is always operating in discovery mode once a service request is received. Likewise in a further embodiment, the slave device 204 is always in an advertise mode; such a slave device may be a conference projector, for example.

In an embodiment, the master communications device 202 and the slave device 204 may engage with each other in the discovery and/or advertisement modes using a sensor, as discussed in greater detail below. As would be appreciated those skilled in the relevant art(s) without departing from the spirit and scope of the present invention, a sensor receives a signal and responds to the received signal. The sensor may be located on the master communications device 202 and/or the slave device 204. As an example, the sensor may be a near field communications device (NFC) or other wireless device to effect the sensor operations.

As discussed above, the operator in operating the master communications device 202 may require additional features and resources over and above those contained in the master communications device 202. In response to the operator's requirements for additional features and resources, the master communications device 202 may enter discovery mode and sends out a slave device request signal 272 to one or more slave devices 204. In response, the slave device 204 sends a slave device discovered signal 276 that indicates whether the slave device 204 is available to the operator. The master communications device 202 receives the slave device discovered signal 276 when the master communications device 202 is able to detect the slave device 204. The master communications device 202 may detect the slave device 204 when the slave device 204 comes within the detection range of the master communications device 202.

The master communications device 202 may also detect a slave device 204 that is operating in an advertise mode. In advertise mode, the slave device 204 generates a slave device advertiser signal 274 that indicates the availability of the slave device 204 to the master communications device 202. In some embodiments, the slave device 204 not only advertises it availability, but also its various capabilities to the master communications device 202. In a further example, the master communications device 202 may instruct the slave device 204 to enter advertise mode using either of signals 274 or 276, so that the master communications device 202 can select an appropriate slave device to meet particular operator requirements.

The master communications device 202 may receive an operator request input 270 that defines requirements for selecting one or more slave devices 204. For example, operator request 270 may define requirements for a slave device to perform a particular function or service, and/or define the number of slave devices that will be necessary to perform a particular service.

Using the slave device request signal 272, the master communications device 202 may also query the resources or capabilities of the slave device 204. The resources of the slave device 204 may include resources that may be provided to the operator. Resources of the slave device 204 may include but not limited to display dimensions, bit per pixel, aspect ratio, frame rate, audio channels, and/or the audio sampling rate.

As would be apparent to those skilled in the relevant art(s) without departing from the spirit and scope of the invention, embodiments of the master slave communications system 200 may include any quantity of slave devices 204 in addition to the master communications device 202. Further, the master slave communications system 200 may include any quantity of master communications devices 202 in addition to the slave device 204.

A Second Exemplary Master Communications Device/Slave Device Configuration

Figure 3:
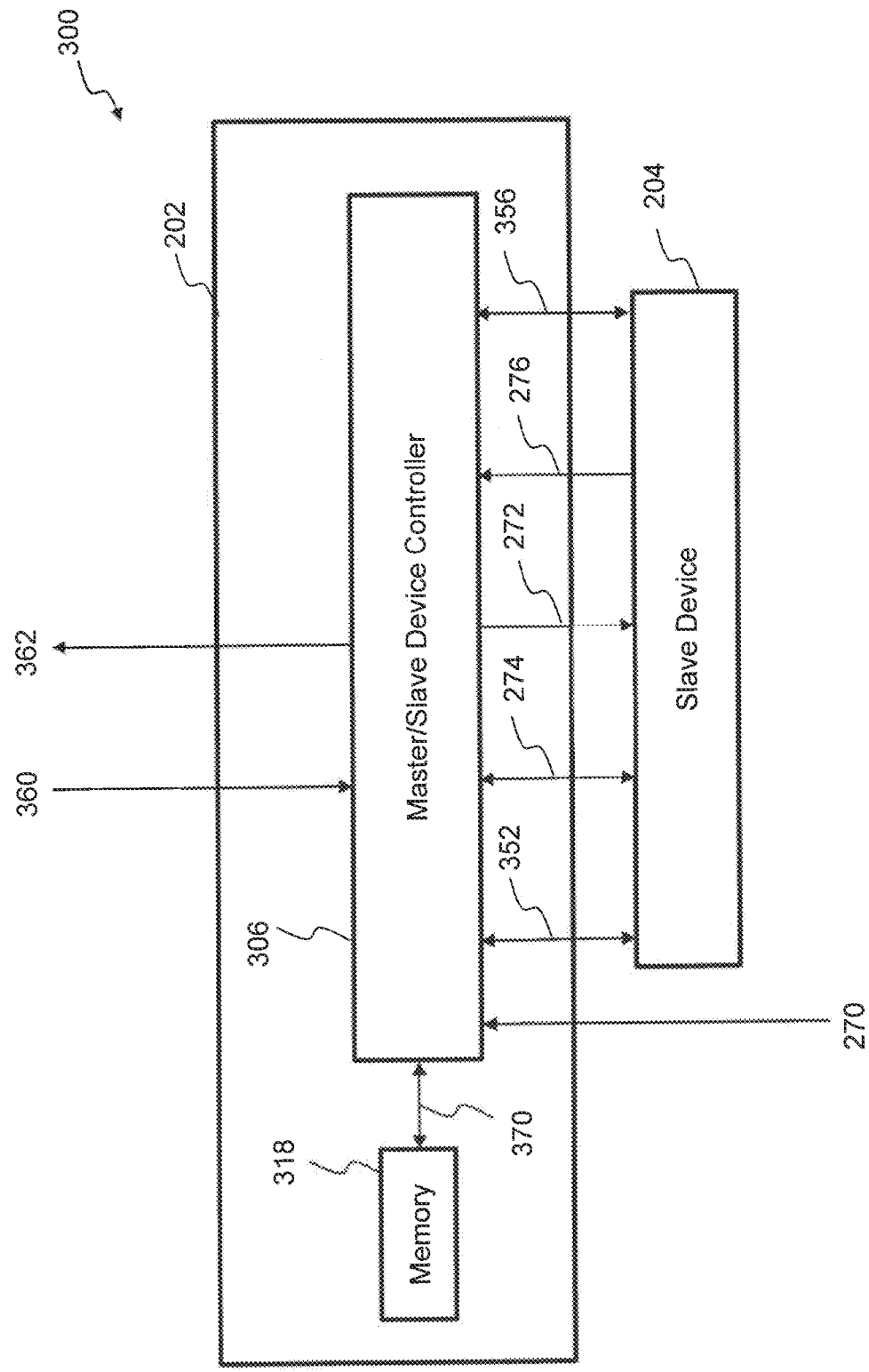
FIG. 3 illustrates a block diagram of a second master slave communications system according to an exemplary embodiment of the invention.

FIG. 3 illustrates a block diagram of a second master slave communications system 300 according to an exemplary embodiment of the invention. The master communications device 202 may be integrated with the slave device 204 to form the master slave communications system 300. The master communications device 202 includes a memory 318 and a master/slave device controller 306.

The master communications device 202 provides functions which may include wireless communication, computing capabilities, and/or any other suitable functionality that will be apparent to those skilled in the relevant art(s) without departing from the spirit and scope of the present invention. The master communications device 202 may also support services relating to computing capabilities, such as Short Message Service (SMS), electronic mail, Internet access, gaming, short range wireless communications, camera, Multimedia Messaging Service (MMS) messaging, digital audio player, radio, and Global Positioning System (GPS) services and/or any other suitable service that will be apparent to those skilled in the relevant art(s) without departing from the spirit and scope of the present invention.

As shown in FIG. 3, the master/slave device controller 306 may receive a received communications signal 360 from another communications device. The master/slave device controller 306 downconverts, demodulates, and/or decodes the received communications signal 360 to recover information, such as one or more commands to be executed by the master communications device 202 and/or data to provide some examples, that is embedded within the received communications signal 360.

As another example, the master/slave device controller 306 may provide a transmitted communications signal 362 to another communications device. The master/slave device controller 306 upconverts, modulates, and/or encodes information to provide the transmitted communications signal 362, where exemplary information may include one or more commands that are to be executed by another communications device and/or data to provide some examples. As a further example, the master/slave device controller 306 may receive the received communications signal 360 from a first external communications device and provide the transmitted communications signal 362 to the same first external communications device, or to a second external communications device.

The master/slave device controller 306 also processes the received communications signal 360 to properly route the information, such as one or more commands and/or data, embedded within the received communications signal 360 to the slave device 204 as slave device data 356. Further, the master/slave device controller 306 may save the received communications signal 360, or a processed version thereof, in the memory 318 as communications data 370.

For example, the master/slave device controller 306 may format the received communications signal 360 into data frames and may perform error encoding, such as cyclic redundancy check (CRC) to provide an example, on the data frames prior to forwarding as slave device data 356 or communications data 370. The data frames may include frame delimiters to indicate a start and/or an end of each of the data frames. As a further example, the master/slave device controller 306 may parse the received communications signal 360 prior to generating the slave device data 356 and/or the communications data 370. The received communications signal 360 may include a header of one or more bits as part of the information. The one or more bits of the header may be interpreted by the master/slave device controller 306 to deter nine whether to route the received communications signal 360 to the slave device 204 and/or to the memory 318. Further, the master/slave device controller 306 may receive and format slave device data 356, for transmission as transmitted communication signal 362. Likewise, master/slave device controller 306 may retrieve and format the communications data 370 for transmission, as transmitted communication signal 362.

The memory 318 reads and/or writes the communications data 370. The memory 318 may include a data store such as a transponder, a tag, a smartcard, read only memory (ROM), random access memory (RAM), magnetic disk storage media, optical storage media, flash memory devices and/or any other suitable machine-readable medium that will be apparent to those skilled in the relevant art(s) without departing from the spirit and scope of the invention that is communicatively coupled to the master/slave device controller 306.

The master/slave device controller 306 processes the operator request input 270, the slave device discovered signal 276, and the slave device advertiser 274 and determines the slave devices, such as the slave device 204 that may be available to the operator through the master communications device 202. In some embodiments, the operator requires added capabilities that the master communications device 202 cannot provide alone. For example, but without limitation, a larger display may be needed to properly view information of received communications signal 360. The master/slave device controller 306 may route at least a portion of the information that is embedded within the received communications signal 360 to the slave device 204 as the slave device data 356. In this example, the complement of services that is provided to the operator is split between the master communications device 202 and the slave device 204. In such a case, the slave device 204 serves as an extension to the master communications device 202 so that the slave device 204 and the master communications device 202 serve the operator as a single interactive system.

When operating as an output device, the slave device 204 receives the slave device data 356 from the master/slave device controller 306, and operates as an output device for the master slave communications system 200. For example, the slave device data 356 may represent data to be displayed by the slave device 204 and/or one or more commands to be executed by the slave device 204.

Alternatively, the slave device 204 may operate as an input device to receive information from the operator that is to be provided to the master/slave device controller 306 as the slave device data 356. The information from the operator may represent data from the operator and/or one or more commands to be executed by the master slave communications system 300.

The master/slave device controller 306 also monitors an available slave device resources signal 352 to determine the resources of the slave device 204 required and/or available to execute the requests of the operator. The slave device resource signal 352 identifies the available resources for one or more slave devices 204. In an embodiment, the master/slave device controller 306 queries the slave device 204 to determine the resources available to the operator in the slave device 204, in order to execute the requests of the operator. Resources requested by the master/slave device controller 306 may include but are not limited to: audio channel, display area, specific frame rate, and specific aspect ratio. If the desired requirements are met, then the slave device 204 grants the requested resources to the master/slave device controller 306.

The following example illustrates the engagement between the master communications device 202 and the slave device 204, where the example is illustrated in the context of visual displays and resources associated with visual displays. As would be apparent to those skilled in the relevant art(s) without departing from the spirit and scope of the invention, the visual displays may also have audio and touch screen capabilities without departing from the spirit and scope of the present invention. The following example applies to any type of resource related to: audio, video, visual, touch screen, and/or any other type of implementation without departing from the spirit and scope of the present invention.

For example, the master/slave device controller 306 queries the slave device(s) 204 to determine the respective available resources, and in response receives the available slave device resources signal 352. The master/slave device controller 306 determines that the frame rate of the slave device 204 is 30 frames per second, the aspect ratio is 4:3, and the bit per pixel is 4:4:4, by examining the available slave device resources signal 352. The master/slave device controller 306 then requests the same frame rate, the aspect ratio and the bit per pixel resources from the slave device 204. The slave device 204 grants the frame rate, the aspect ratio, and the bit per pixel resources to the master/slave device controller 306.

The master/slave device controller 306 processes the available slave device resources signal 352 to intelligently route the slave device data 356 to the slave device 204. For example, the master/slave device controller 306 receives the available slave device resources signal 352 that identifies the frame rate of 30 frames per second, the aspect ratio of 4:3, and the bit per pixel of 4:4:4 for the slave device 204. As another example, the available slave device resources signal 352 may identify exemplary display screen parameters of the slave device, such as 1680×1050 for a screen size. Based on these resources, the master/slave device controller 306 configures the master communications device 202 and the slave device 204 in order to best display information to the operator, where the configuration takes into account the resources of the slave device 204. The master/slave device controller 306 communicates the configuration of the slave device 204 with the slave device data 356.

For example, the master/slave device controller 306 sets the proper audio sampling rate, the proper bit rate, the proper display configuration, and the proper ratio for the master communications device 202 and the slave device 204 so as to properly display the information to the operator. For example, the master communications device 202 may include a high definition television (HDTV) with a bit rate of 15 Mbit/s. However, the available slave device resources signal 352 may include a standard definition television bit rate of 3.5 Mbit/s. Based on the bit rate of the slave device 204, master/slave device controller 306 may configure the display of the master communications device 202 to occur at the slave device 204 bit rate of 3.5 Mbit/s rather than the master communications device 202 bit rate of 15 Mbit/s. In doing so, the information may be properly displayed to the operator on the master communications device 202 and the slave device 204. The master/slave device controller 306 communicates the bit rate of 3.5 Mbit/s to the slave device 204 with the slave device data 356.

In another example, the master/slave device controller 306 configures the master communications device 202 and the slave device 204 so that the master communications device 202 and the slave device 204 display the information as a single display to the operator. In such an example, the master/slave device controller 306 may configure the master communications device 202 to display half of the information (e.g. half of an image). The master/slave device controller 306 may also configure the slave device 204 to display the other half of the information. In doing so, the master communications device 202 and the slave device 204 act as a single interactive system to the operator in displaying the information. The master/slave device controller 306 communicates the portion of the information to be displayed by the slave device 204 with the slave device data 356.

As would be apparent to those skilled in the relevant art(s) without departing from the spirit and scope of the invention, any combination of the information may be displayed on any combination of the master communications device 202 and the slave device 204. Further, any quantity of master communications devices and slave devices may be incorporated without departing from the spirit and scope of the invention. For example, the master/slave device controller 306 may configure the master communications device 202 and multiple slave devices 204 so that each displays fractional portions of the information, where the fractional portions assigned to the various devices may be different from each other.

Exemplary Embodiments of Master Communications Device/Slave Device Configurations The following exemplary embodiments illustrate the engagement between the master communications device 202 and the slave device 204. The below example is illustrated in the context of visual displays and resources associated with visual displays. As would be apparent to those skilled in the relevant art(s) without departing from the spirit and scope of the invention, the visual displays may also have audio, touch screen sensing capabilities, and/or any other capabilities without departing from the spirit and scope of the present invention. The following examples apply to any type of resource related to audio, video, visual, touch screen, and/or any other type of implementation without departing from the spirit and scope of the present invention.

Figure 4A:
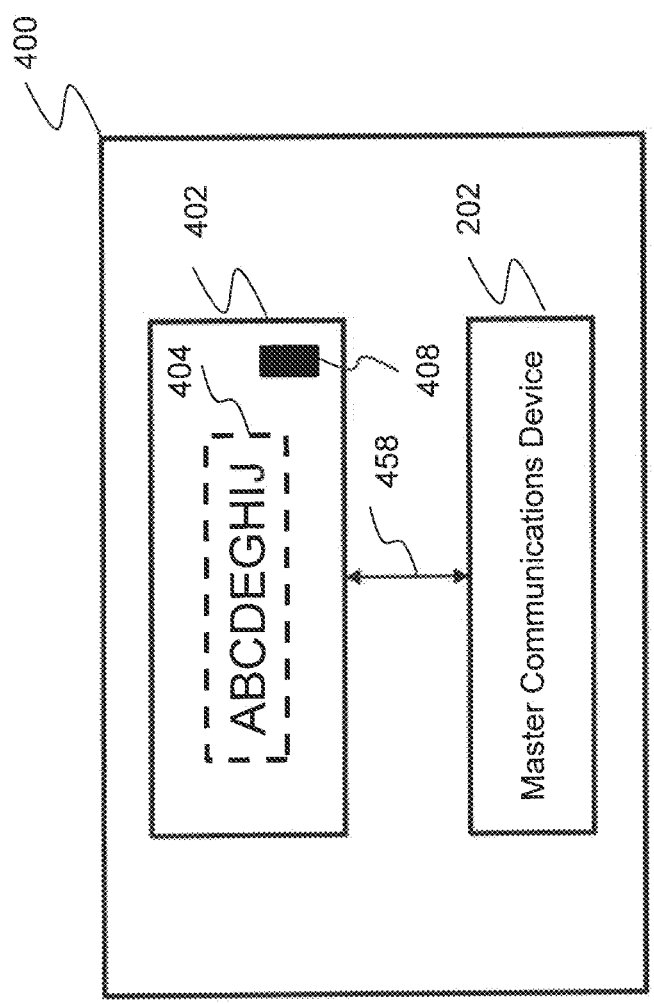
FIG. 4A illustrates a first exemplary master communications device according to an exemplary embodiment of this invention.

FIG. 4A illustrates a first exemplary master communications system according to an exemplary embodiment of this invention. The master communications system 400 includes the master communications device 202, a master display 402, a sensor 408, and display information 404.

The master display 402 may be, for example, an output device to display information to the operator relating to the services provided by the master communications device 202. Specifically, the master display 402 may be configured to display all of the data included in the display information 404. The master communications device 202 communicates the display information 404 to the master display 402 using the master display data 458. In such an example, additional devices are not required by the operator.

Figure 4B:
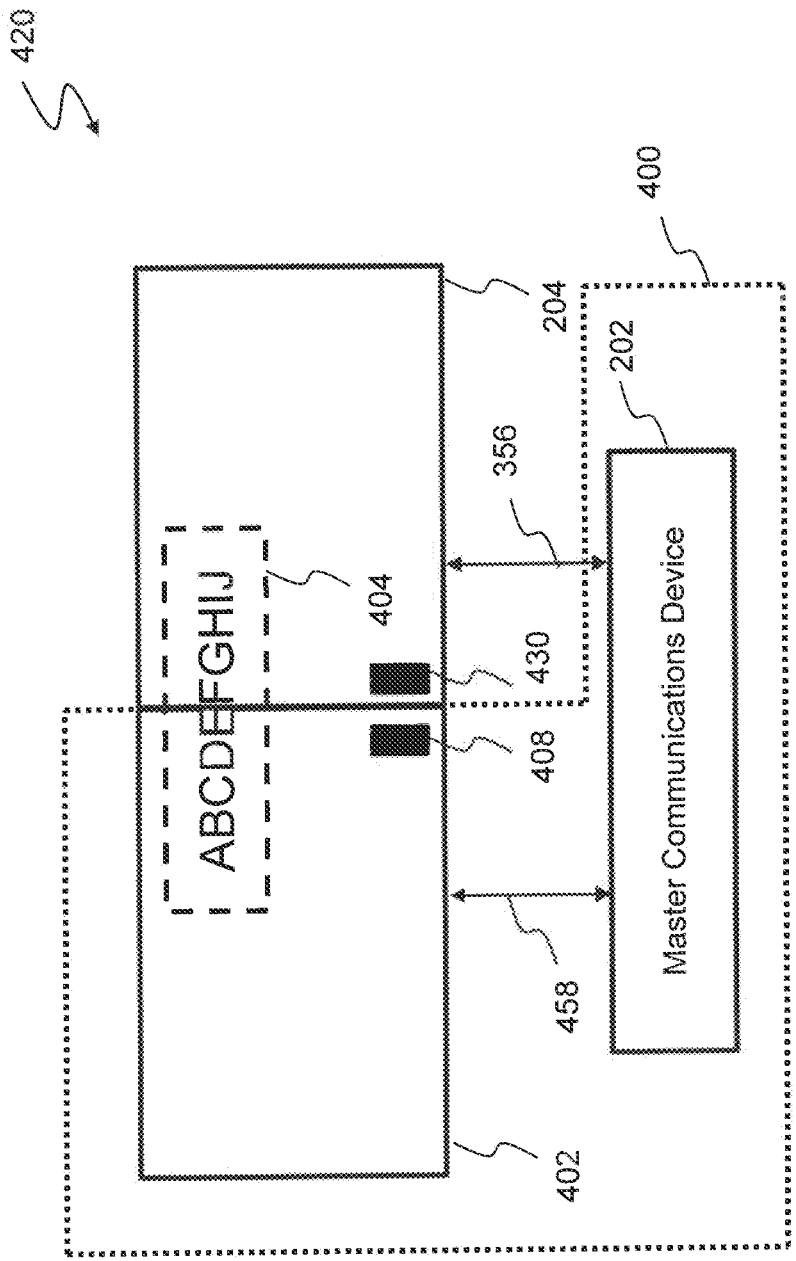
FIG. 4B illustrates a first exemplary master slave communications system according to an exemplary embodiment of this invention.

FIG. 4B illustrates a first exemplary master slave communications system 420 according to an exemplary embodiment of the invention. The master slave communications system 420 includes the master communications system 400, a slave device 204, and a sensor 430. The master communications system 400 includes the master communications device 202, the master display 402, and the sensor 408. The slave device 204 and the master display 402 each display portions of the display information 404.

The slave device 204 may be, for example, an output device to display information relating to the services provided by the slave device 204 to the operator. Specifically, the slave device 204 may be configured to display a portion of the data included in the display information 404. Accordingly, the slave device 204 may be configured to display the portion of the data included in the display information 404 that is not displayed by the master display 402. The master communications device 202 communicates the portion of the display information 404 to be displayed by the master display 402 using the master display data 458. The master communications device 202 communicates the portion of the display information 404 to be displayed by the slave device 204 using the slave device data 356.

The master display 402 may be extended by attaching the slave device 204 to the master display 402. By attaching the slave device 204 to the master display 402, the display provided to the operator is enlarged. Instead of attachment, the slave device 204 may simply be placed physically adjacent to the master display 402, as shown. The sensor 408 may be located on the master display 402 and the sensor 430 may be located on the slave device 402. The sensor 408 may detect the slave device 204 as the slave device 204 when the sensor 430 comes within the detection range of the sensor 408. Once the slave device 204 has come within the detection range of the sensor 408, the master communications device 202 may communicate the display information 404 to the slave device 204 with the slave device data 356. A method of communicating the slave device data 356 may include but is not limited to: Wi-Fi, high definition multimedia interface (HDMI), and/or any type of wireless communication without departing from the spirit and scope of the present invention. The master communications device/slave configuration 420 depicts the seamless and automated attachment of the master display 402 to the slave device 204, where the display information 404 is displayed seamlessly across the master display 402 and the slave device 406 in an integrated fashion.

FIG. 4C illustrates a second exemplary master slave communications system 440 according to an exemplary embodiment of this invention. Master slave communications system 440 includes the master communications system 400, the slave device 204, a slave device 410, a slave device 412, the sensor 408, the sensor 430, a sensor 432, and a sensor 434. The master communications device system 400 includes the master communications device 202, the master display 402, and the sensor 408. The slave device 412 and the slave device 410 share in the display of display information 404. The master display 402 and the slave device 204 share in the display of display information 422. The slave devices 410 and 412 may represent exemplary embodiments of the slave device 204.

As with the slave device 204, the slave devices 410 and 412 may be characterized as output devices to display information relating to the services provided by the slave devices 410 and 412 to the operator. Specifically, the master display 402 may be configured to display a portion of the data included in the display information 422. Accordingly, the slave device 204 may be configured to display portions of the data included in the display information 422 that is not displayed by the master display 402. The master communications device 202 communicates the portion of the display information 422 to be displayed by the master display 402 with the master display data 458. The master communications device 202 communicates the portion of the display information 422 to be displayed by the slave device 204 with the slave device data 356.

The slave device 412 may be configured to display a portion of the data included in the display information 404, and the slave device 410 may be configured to display portions of the data included in the display information 404 that is not displayed by the slave device 412. The master communications device 202 communicates the portions of the display information 404 to be displayed by the slave device 412 and the slave device 410 with the slave device data 356.

The master display 402 may be extended by attaching the slave devices 204, 410, and 412 to the master display 402. By attaching the slave devices 204, 410, and 412 to the master display 402, the display provided to the operator is enlarged. Instead of attachment, the slave devices 204, 410, and 412 may be placed physically adjacent to the master display 402 and to each other, as shown. The sensor 408 may detect the slave devices 204, 410, and 412 when the sensors 430, 432, and 434 respectively come into the detection range of the sensor 408. Once the slave devices 204, 410, and 412 have come within the detection range of the master display 402, the master communications device 202 may communicate the display information 404 and 422 to the slave devices 204, 410, and 412 with the slave device data 356. A method of communicating the slave device data 356 may include but is not limited: to Wi-Fi, high definition multimedia interface (HDMI), and/or any type of wireless communication without departing from the spirit and scope of the present invention. The master slave device communications system 440 depicts the seamless and automated attachment of the master display 402 to the slave devices 204, 410, and 412, where the display information 404 and 422 may be displayed seamlessly across the master display 402 and the slave devices 204, 410, and 41.

Figure 4D:
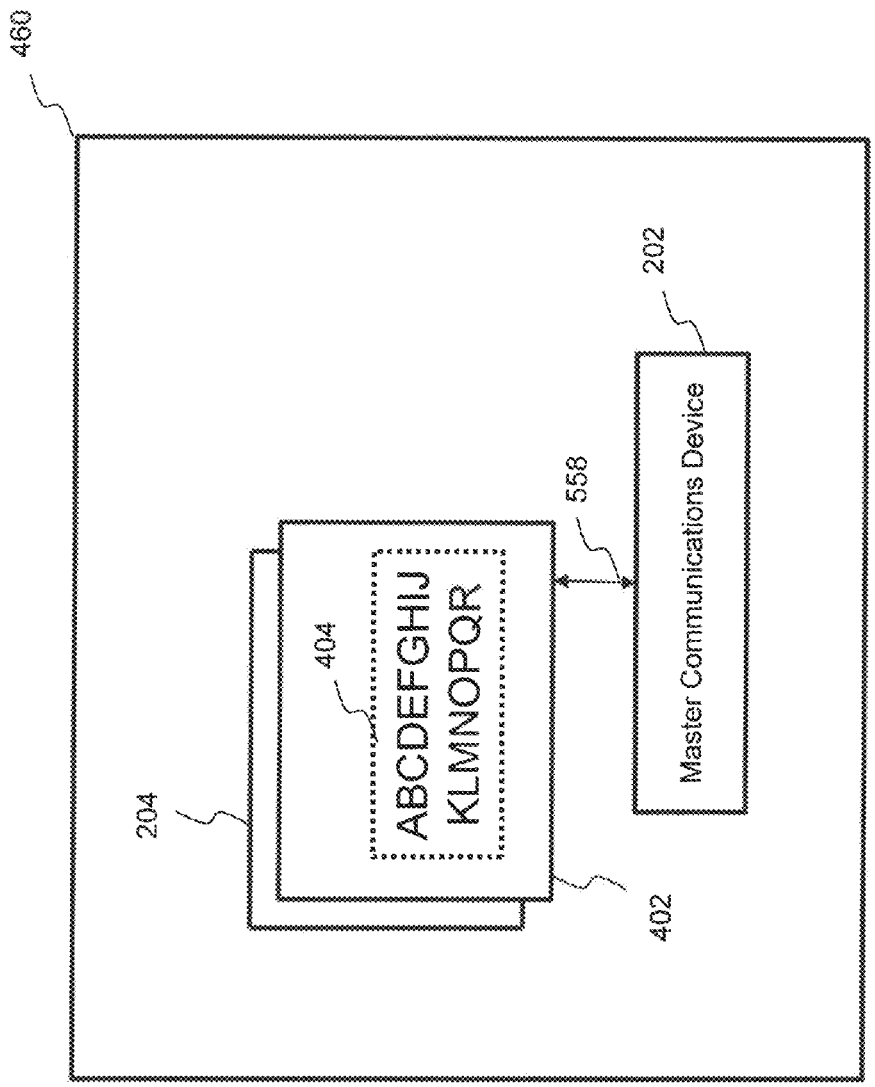
FIG. 4D illustrates a third exemplary master slave communications system according to an exemplary embodiment of this invention.

FIG. 4D illustrates a third exemplary master slave communications system 460 according to an exemplary embodiment of this invention. Master slave communications system 460 includes the master communications device 202, the master display 402, the slave device 204, and the display information 404.

The master display 402 may be the primary active display for the operator while the slave device 204 may be a secondary inactive display for the operator. Specifically, the master display 402 may be visibly exposed and active to the operator while the slave device 204 may be folded and/or tucked away in the master slave communications system 460. In this folded mode, the slave device 204 may be inactive and not visibly exposed to the operator for use. In such an embodiment, the slave device 204 may not be powered on and in turn may not be deriving power from the master slave communications system 460. The master display 402 may be configured to display the data included in the display information 404.

Figure 4E:
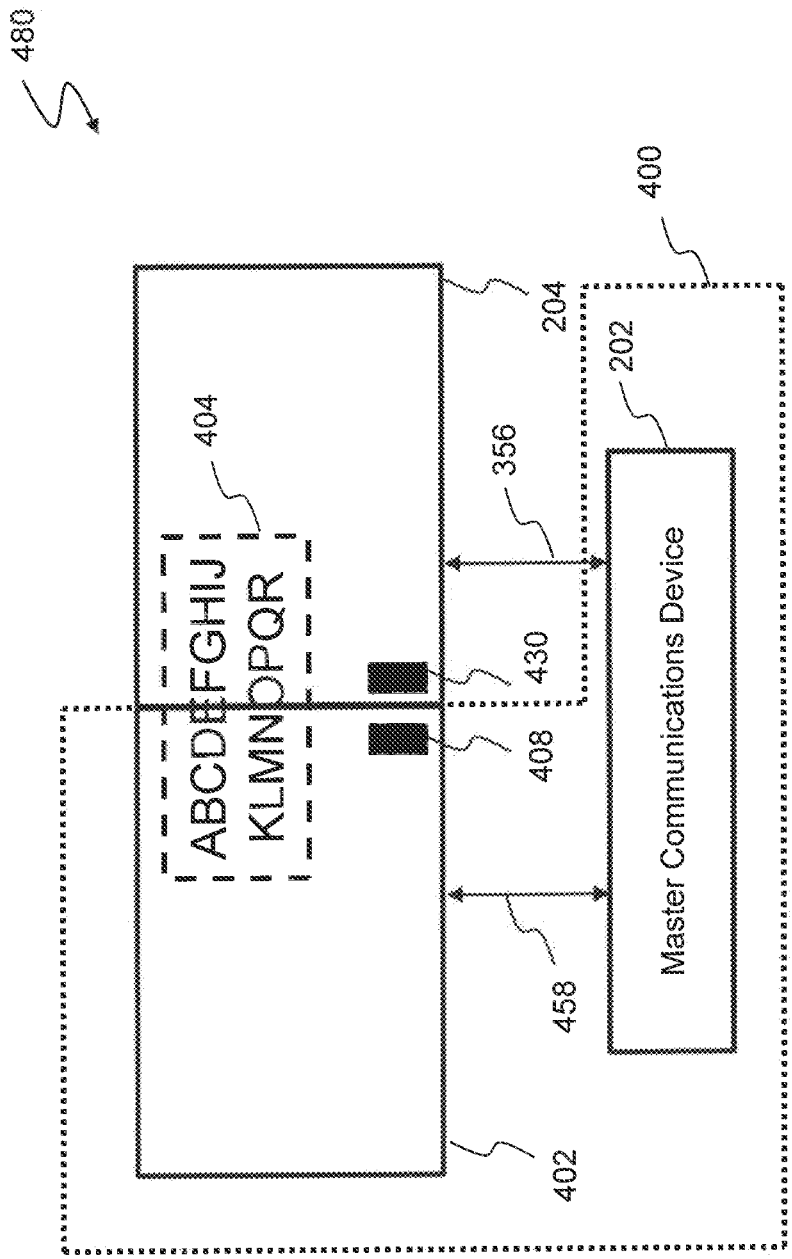
FIG. 4E illustrates a fourth exemplary master slave communications system according to an exemplary embodiment of this invention.

FIG. 4E illustrates a fourth exemplary master slave communications system 480 according to an exemplary embodiment of this invention. Master slave communications system 480 represents the master slave communications system 460 exhibited in FIG. 4D, where the slave device 204 is unfolded and therefore visibly exposed.

In such an embodiment, the operator requires additional capabilities and resources to supplement the master display 402. To provide those additional user interface capabilities, the slave device 204 may be unfolded and placed as an extension to the master display 402. In this unfolded mode, the slave device 204 is now active and exposed to the operator so that the operator may use both the master display 402 and the slave device 204, simultaneously. The master display 402 may be configured to display a portion of the data included in the display information 404, and the slave device 204 may be configured to display the portion of the data included in the display information 404 that is not displayed by the master display 402.

The slave device 204 may be powered by the master communications device 202. In such an embodiment, the power drawn from the master communications device 202 by the slave device 204 and the master display 402 may be greater than in FIG. 4D, where only the master display 402 is drawing power. Alternatively, the slave device 204 may be powered by its own power supply. The master slave communications system 480 depicts the seamless and automated attachment of the master display 402 to the slave device 204, where display information 404 may be displayed seamlessly across the master display 402 and the slave device 204.

An Exemplary Operations Control Flow of the Master/Slave Device Controller

FIG. 5 is a flowchart of exemplary operational steps of the master/slave device controller according to an exemplary embodiment of the present invention. The invention is not limited to this operational description. Rather, it will be apparent to persons skilled in the relevant art(s) from the teachings herein that other operational control flows are within the scope and spirit of the present invention. The following discussion describes the steps in FIG. 5.

At step 510, the operational control flow receives a request to perform a service. The service may include wireless communication between communications devices, and/or other computing capabilities: such as Short Message Service (SMS), electronic mail, Internet access, gaming, short range wireless communications, camera, Multimedia Messaging Service (MMS) messaging, digital audio player, radio, and Global Positioning System (GPS) services, and/or any other suitable service that will be apparent to those skilled in the relevant art(s) without departing from the spirit and scope of the present invention.

At step 520, the operational control flow inventories features and resources available to the master communications device, such as the master communications device 202, to perform the service. The operational control flow queries the features and resources available to the master communications device and determines whether those features and resources available to the master communications device are sufficient to perform the service requested. Specifically, the operational control flow compares the features and resources available to the master communications device to requirements of performing the service to determine whether additional features and resources may be required by the master communications device in performing the service.

At step 530, the operational control flow engages a slave device, such as the slave device 204, to serve as an extension to the master communications device. The operational control flow may provide a discovered slave device signal, such as the discovered slave device signal 276, that indicates the slave device is available to the master communications device 202 to perform the service.

At step 540, the operational control flow provides additional features and resources to the master communications device, such as the master communications device 202 to provide an example, in addition to the features and resources already available to the master communications device. The operational control flow may provide the features and resources of the slave device, such as the slave device 204 to provide an example, to the master communications device in performing the service.

Embodiments of the invention may be implemented in hardware, firmware, software, or any combination thereof. Embodiments of the invention may also be implemented as instructions stored on a machine-readable medium, which may be read and executed by one or more processors. For example, the master/slave device controller 306 may be implemented as one or more processor(s), that implements its functionality as software instructions performed by the processor. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A master slave communications system, comprising:
a master communications device including a first display device and a controller, the controller being configured to:
compare a capability of the first display device with a requirement for displaying information, the first display device being configured to display a first portion of the information; and
a slave device configured to:
receive an instruction from the master communications device to enter a mode to allow the master communications device to select the slave device to assist with displaying the information when the requirement necessitates engaging the slave device;
assist the master communications device with displaying the information when the requirement necessitates engaging the slave device, and
serve as an extension to the master communications device by providing a second display device to the master communications device, and
receive a second portion of the information from the master communications device when the requirement necessitates engaging the slave device, the second display device being configured to display the second portion of the information.

2. The master slave communications system of claim 1, wherein the master communications device is further configured to detect the slave device as being configured to operate as a secondary device with the master communications device to display the second portion of the information.

3. The master slave communications system of claim 2, wherein the slave device is further configured to advertise a capability of the slave device to operate as the secondary device.

4. The master slave communications system of claim 1, wherein the controller is further configured to determine that the second display device is available from the slave device to display the second portion of the information.

5. The master slave communications system of claim 4, wherein the controller is further configured to route the second portion of the information to the slave device when the slave device is detected as being configured to operate as a secondary device to display the second portion of the information.

6. The master slave communications system of claim 4, wherein the controller is further configured to query the slave device for availability of the second display device.

7. The master slave communications system of claim 1, wherein the slave device is configured to serve as the extension of the master communications device so that the slave device and the master communications device act as a single integrated system for displaying the information.

8. The master slave communications system of claim 1, wherein the master communications device is configured to wirelessly communicate with the slave device.

9. The master slave communications system of claim 1, wherein the master communications device is further configured to determine whether the first display device is sufficient to display the information.

10. The master slave communications system of claim 9, wherein the master communications device is further configured to transmit the second portion of the information to the slave device when the first display device is insufficient to display the information.

11. A master slave communications system, comprising:
a master communications device including a first display device; and
a slave device configured to assist the master communications device with displaying information of the master communications device and to serve as an extension to the master communications device by providing a second display device to the master communications device,
wherein the first and the second display devices are configured to display a first portion and a second portion, respectively, of the information, and
wherein the slave device is configured to mechanically unfold from the master slave communications system when requested to serve as the extension of the master communications device.

12. A method for seamlessly displaying information among a plurality of devices, comprising:
comparing, by the master communications device, a capability of the master communications device with a requirement for displaying the information;
transmitting, by the master communications device, an instruction to a slave device from among the plurality of devices to enter a mode to allow the master communications device to select the slave device to assist with displaying the information when the requirement necessitates engaging the slave device;
engaging, by the master communications device, the slave device to determine whether a first display device is available to aid the master communications device in displaying the information;
displaying, by the master communications device, a first portion of the information using a second display device; and
sending a second portion of the information, by the master communications device, to be used by the first display device to display the second portion of the information.

13. A method for seamlessly displaying information among a plurality of devices, comprising:
determining, by the master communications device, whether a first display device of the master communications device is sufficient to display the information;
transmitting, by the master communications device, an instruction to a slave device from among the plurality of devices to enter a mode to allow the master communications device to select the slave device to assist with displaying the information;
engaging, by the master communications device, the slave device to determine whether a second display device is available to aid the master communications device in displaying the information;
displaying, by the master communications device, a first portion of the information using the first display device; and
sending a second portion of the information, by the master communications device, to be used by the second display device to display the second portion of the information; and
wherein the engaging the slave device, the displaying the first portion of the information, and the sending the second portion of the information are performed only when the first display device is insufficient to display the information.

14. The method of claim 12, wherein the engaging the slave device comprises:
sending, by the master communications device, a request to search for the slave device; and
receiving, by the master communications device, a response to the request indicating that the slave device is available to aid the master communications device in displaying the information.

15. The method of claim 12, wherein the engaging the slave device comprises:
receiving, by the master communications device, an advertisement indicating that the slave device is available to aid the master communications device in displaying the information.

16. A method for seamlessly displaying information among a plurality of devices, comprising:
receiving, by a slave device from among the plurality of devices, an instruction from a master communications device from among the plurality of devices to enter a mode to allow the master communications device to select the slave device to aid with displaying the information;
mechanically unfolding the slave device from the master communications device when the slave device is to aid with displaying the information;
engaging, by the slave device, the master communications device to provide a display device to aid the master communications device in displaying the information; and
receiving a portion of the information, by the slave device, to be used by the display device to display the portion of the information.

17. The method of claim 16, wherein the engaging the master communications device comprises:
receiving, by the slave device, a request from the master communications device to aid in displaying the information; and
sending, by the slave device, a response to the request indicating availability of the slave device to aid the master communications device in displaying the information.

18. The method of claim 16, wherein the receiving the portion of the information comprises:
sending, by the slave device, an advertisement indicating that the slave device is available to aid the master communications device in displaying the information.

19. A master communications device, comprising:
a first display device; and
a controller configured to:
compare a capability of the first display device with a requirement for displaying information,
transmit a first portion of the information to the first display device when the requirement necessitates engaging a second display device of a slave device,
transmit an instruction to the slave device to enter a mode to allow the master communications device to select the slave device to assist with displaying the information when the requirement necessitates engaging the slave device, and
transmit a second portion of the information to the second display device when the requirement necessitates engaging the slave device, wherein the first display device is configured to display the information when the requirement does not necessitate engaging the slave device or to display the first portion of the information when the requirement necessitates engaging the slave device.

20. The master communications device of claim 19, wherein the second display device is configured to display the second portion of the information when the requirement necessitates engaging the slave device.

21. The master communications device of claim 19, wherein the slave device is from among a plurality of slave devices,
    wherein the controller is further configured to:
        transmit a third portion of the information to a third display device of a second slave device from among the plurality of slave devices when the requirement necessitates engaging the second slave device, and
    wherein the third display device is configured to display the third portion of the information when the requirement necessitates engaging the second slave device.

22. The master communications device of claim 19, further comprising:
    a sensor configured to detect the slave device when the slave device is within a detection range of the sensor.

\* \* \* \* \*